United States Patent
Kwon et al.

(10) Patent No.: US 8,120,670 B2
(45) Date of Patent: Feb. 21, 2012

(54) APPARATUS AND METHOD FOR CONTROLLING GAIN OF COLOR SIGNAL

(75) Inventors: Tae Hyeon Kwon, Seoul (KR); Won Tae Choi, Gyunggi-do (KR); Tae Eung Kim, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 540 days.

(21) Appl. No.: 12/276,138

(22) Filed: Nov. 21, 2008

(65) Prior Publication Data

US 2010/0013952 A1  Jan. 21, 2010

(30) Foreign Application Priority Data

Jul. 17, 2008 (KR) .................. 10-2008-0069711

(51) Int. Cl.
 *H04N 9/73* (2006.01)
 *G06K 9/00* (2006.01)
(52) U.S. Cl. .................. 348/225.1; 348/223.1; 382/162; 382/167
(58) Field of Classification Search .... 348/223.1–225.1; 382/162, 167
See application file for complete search history.

(56) References Cited

U.S. PATENT DOCUMENTS

| | | | |
|---|---|---|---|
| 2006/0164521 A1* | 7/2006 | Chikane et al. | 348/223.1 |
| 2007/0159537 A1* | 7/2007 | Miyao et al. | 348/223.1 |
| 2007/0165113 A1* | 7/2007 | Suzuki | 348/223.1 |
| 2008/0062274 A1* | 3/2008 | Hamamura | 348/223.1 |
| 2009/0021602 A1* | 1/2009 | Fujiwara et al. | 348/223.1 |
| 2010/0026835 A1* | 2/2010 | Negishi et al. | 348/223.1 |

FOREIGN PATENT DOCUMENTS

JP  2008-052428 A  3/2008

\* cited by examiner

*Primary Examiner* — Sinh Tran
*Assistant Examiner* — Christopher K Peterson
(74) *Attorney, Agent, or Firm* — Lowe, Hauptman, Ham & Berner, LLP

(57) ABSTRACT

An apparatus for controlling gain of color signal includes an auto white balance algorithm applying unit determining a white estimation region from an input image, and calculating a first color signal gain for correcting an average color signal level of pixels of the white estimation region to white, a pixel determining unit determining a form of each pixel according to brightness and color using the color signal level of the each pixel of the input image, and a color signal gain determining unit determining a color signal gain to be applied to the each pixel according to the form of the each pixel of the input image as any one of the first color signal gain, a second color signal gain determined by the color signal level of the each pixel for correcting the each pixel to white and a unit gain.

20 Claims, 5 Drawing Sheets

APPARATUS AND METHOD FOR CONTROLLING GAIN OF COLOR SIGNAL

CROSS-REFERENCE TO RELATED APPLICATIONS

This application claims the priority of Korean Patent Application No. 2008-69711 filed on Jul. 17, 2008, in the Korean Intellectual Property Office, the disclosure of which is incorporated herein by reference.

BACKGROUND OF THE INVENTION

1. Field of the Invention

The present invention relates to a digital image process field, and more particularly, to an apparatus and method for controlling a gain of a color signal applied to each pixel according to a level of the color signal by pixel of a digital image.

2. Description of the Related Art

In general, a person's vision always recognizes as having the same color on the same subject in spite of the change of a light source. That is, even in a case where a light source is changed into other light source having different color temperature like sun lights, fluorescent lamps and incandescent lamps, the person's vision always recognizes white as the same white. On the other hand, since an image sensor using a solid state imaging device is a device that converts light into an electric signal, it detects the changed color of a subject, which has a color changed according to light sources, as it is. Accordingly, most digital image processing devices (for example, digital cameras) use an algorithm for a white balance adjustment in order to represent a color detected by the image sensor similarly to the person's vision.

Generally, an auto white balance adjustment performed in the digital image processing device allows a white subject having a middle brightness level in an image to be represented in a color signal (RGB signal) having the same output level. The most general algorithm used for a relate art auto white balance adjustment adopts a scheme that calculates a color average value on the assumption of that the color average value of a screen is white regardless of the change of a light source, calculates a gain of a color signal level capable of moving the color average value to white, and applies the calculated gain to an entire image. That is, a related art auto white balance adjustment algorithm calculates and applies the gains of an R and B signals capable of correcting so that enables the R and B signals to have the same signal level as that of a G signal on a color signal (RGB signal) output from the image sensor. The related art algorithm adjusts the white balance on the basis of a gray world assumption that an integrated color is similar to an acromatic color when total color components included in an image screen are integrated.

However, the related art auto white balance adjustment algorithm adopts a scheme that performs the multiplication of the same gains on all input pixels before the correction of a gain upon correction of a color signal through the gain adjustment of the R and B signal levels. Accordingly, in a case where there exist two light sources or an emitting subject in a picture so that the picture is represented as a very bright region, the related art auto white balance adjustment algorithm corrects a color with one gain on the bright region. Therefore, a phenomenon can occur in which a color of a white region having a high brightness goes wrong, and the deflection of white balance can occur according to a level of an acromatic color region.

SUMMARY OF THE INVENTION

An aspect of the present invention provides an apparatus and method for controlling a gain of a color signal, which controls a gain of a color signal of a corresponding pixel according to a color signal level that each pixel has by pixel unit of a digital image, thereby representing the color signal of the digital image more accurately naturally.

According to an aspect of the present invention, there is provided an apparatus for controlling gain of color signal, including: an auto white balance algorithm applying unit determining a white estimation region from an input image, and calculating a first color signal gain for correcting an average color signal level of pixels of the white estimation region to white; a pixel determining unit determining a form of each pixel according to brightness and color using the color signal level of the each pixel of the input image; and a color signal gain determining unit determining a color signal gain to be applied to the each pixel according to the form of the each pixel of the input image as any one of the first color signal gain, a second color signal gain determined by the color signal level of the each pixel for correcting the each pixel to white and a unit gain.

The auto white balance algorithm applying unit may include: a color space converter converting a color space of the input image from an RGB color space to a YCbCr color space; a white region detector detecting a region capable of estimating an existence of a distorted white pixel on Cb-Cr coordinates of the converted color space; an average value calculator integrating Y, Cb and Cr values of pixels of the region detected by the white region detector to calculate an average value of the Y, Cb and Cr values; and an auto white balance gain calculator calculating the first color signal gain for moving the Y, Cb and Cr average values calculated by the average value calculator to the origin of the Cb-Cr coordinates.

The pixel determining unit may; determine a corresponding pixel as a first form when a G signal level of a pixel of the input image is greater than a preset first threshold for determining a high brightness pixel, R and B signal levels are greater than a second threshold that is preset for determining a high brightness pixel and is less than the first threshold, and the R and B signal levels are greater than the G signal level; determine a corresponding pixel as a second form when the G signal level of the pixel of the input image is greater than the first threshold, the R and B signal levels are greater than the second threshold, the R and B signal levels are less than the G signal level, and the R and B signal levels are greater than the first threshold; determine a corresponding pixel as a third form when the G signal level of the pixel of the input image is greater than the first threshold, the R and B signal levels are greater than the second threshold, the G signal level is greater than or equal to the R and B signal levels, and the R and B signal levels are less than the first threshold; determine a corresponding pixel as a fourth form when the G signal level of the pixel of the input image is greater than the first threshold, the R and B signal levels are greater than the second threshold, and any one of the R and B signal levels is greater than the G signal level; and determine a corresponding pixel as a fifth form when the G signal level of the pixel of the input image is less than the first threshold, or the R and B signal levels are less than the second threshold.

The color signal gain determining unit may determine a color signal gain of the pixel determined in the first form as the unit gain.

The color signal gain determining unit may determine a color signal gain of the pixel determined in the second form as the second color signal gain.

When a pixel is determined in the third form, the color signal gain determining unit may; determine a color signal gain of a corresponding pixel as the first color signal gain, when a level difference between the R and B signal levels is greater than a preset third threshold; compare a multiplication result of an R signal level of a corresponding pixel and an R signal gain of the first color signal gain with a G signal level of a corresponding pixel, when the level difference between the R and B signal levels is less than the third threshold; determine an R signal gain of a corresponding pixel as an R signal gain of the second color signal gain, when the G signal level is less than the multiplication result of the R signal level of the corresponding pixel and the R signal gain of the first color signal gain; determine an R signal gain of a corresponding pixel as the R signal gain of the first color signal gain and compares a multiplication result of a B signal level of a corresponding pixel and a B signal gain of the first color signal gain with a G signal level of a corresponding pixel, when the G signal level is greater than the multiplication result of the R signal level of the corresponding pixel and the R signal gain of the first color signal gain; determine a B signal gain of a corresponding pixel as the B signal gain of the second color signal gain when the G signal level is less than the multiplication result of the B signal level of the corresponding pixel and the B signal gain of the first color signal gain; and determine a B signal gain of a corresponding pixel as the B signal gain of the first color signal gain when the G signal level is greater than the multiplication result of the B signal level of the corresponding pixel and the B signal gain of the first color signal gain.

When a pixel is determined in the fourth form, the color signal gain determining unit may determine a color signal gain of a corresponding pixel as the first color signal gain, when a level difference between the R and B signal levels is greater than a preset fourth threshold, and determine a color signal gain of a corresponding pixel as the unit gain, when the level difference between the R and B signal levels is less than the preset fourth threshold.

The color signal gain determining unit may determine a color signal gain of the pixel determined in the fifth form as the first color signal gain.

The first color signal gain may be determined by the following equation, $$R_{gain\_AWB} = G_{avg}/R_{avg}$$

$$B_{gain\_AWB} = G_{avg}/B_{avg}$$

where $R_{gain\_AWB}$ represents an R signal gain of the first color signal gain, $B_{gain\_AWB}$ represents a B signal gain of the first color signal gain, $G_{avg}$ represents the average of the G signal levels of pixels in the white estimation region, $R_{avg}$ represents the average of the R signal levels of the pixels in the white estimation region, and $B_{avg}$ represents the average of the B signal levels of the pixels in the white estimation region.

The second color signal gain may be determined by the following equation, $$R_{gain\_in} = G_{in}/R_{in}$$

$$B_{gain\_in} = G_{in}/B_{in}$$

where $R_{gain\_in}$ represents an R signal gain of the second color signal gain, $B_{gain\_in}$ represents a B signal gain of the second color signal gain, $G_{in}$ represents the G signal level of each pixel, $R_{in}$ represents the R signal level of each pixel, and $B_{in}$ represents the B signal level of each pixel.

According to another aspect of the present invention, there is provided a method for controlling gain of color signal, the method including: determining a white estimation region from an input image, and calculating a first color signal gain for correcting an average color signal level of pixels of the white estimation region to white; determining a form of each pixel according to brightness and color using the color signal level of the each pixel of the input image; and determining a color signal gain to be applied to the each pixel according to the form of the each pixel of the input image as any one of the first color signal gain, a second color signal gain determined by the color signal level of the each pixel for correcting the each pixel to white and a unit gain.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the figures, the shapes and sizes of the elements may be exaggerated for further clarity of illustration.

Figure 1:
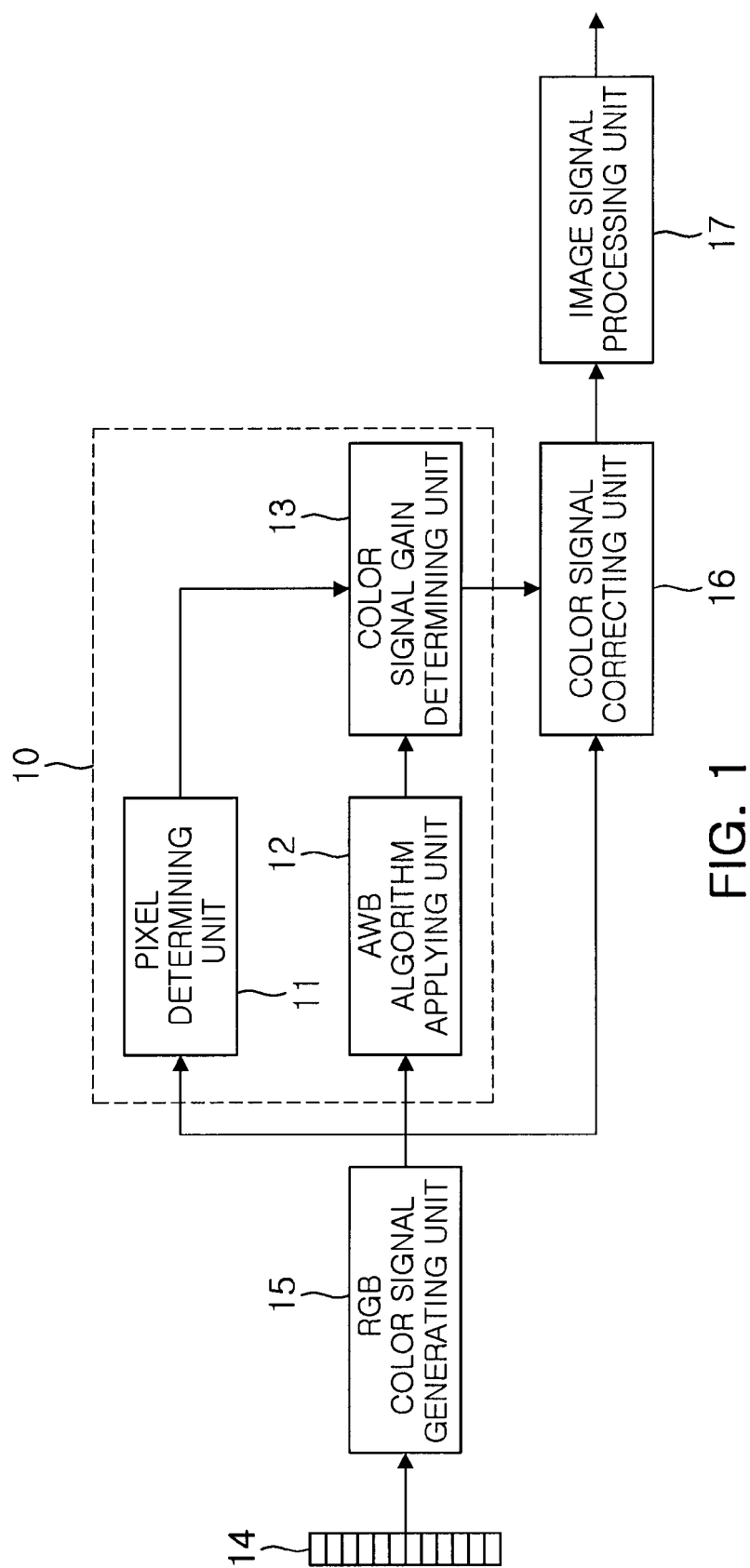
FIG. 1 is a block diagram of an image apparatus to which an apparatus for controlling a gain of a color signal according to an exemplary embodiment of the present invention is applied.

FIG. 1 is a block diagram of an image apparatus to which an apparatus for controlling a gain of a color signal according to an exemplary embodiment of the present invention is applied.

Referring to FIG. 1, an apparatus 10 for controlling a gain of a color signal according to an exemplary embodiment of the present invention includes an auto white balance algorithm applying unit 12 determining a white estimation region from an input image and calculating a first color signal gain for correcting the average color signal level of pixels included in the white estimation region to white, a pixel determining unit 11 determining a form of each pixel according to brightness and color using the color signal level of the each pixel included in the input image, and a color signal gain determining unit 13 determining a color signal gain to be applied to the each pixel according to the form of the each pixel of the input image as any one of the first color signal gain, a second color signal gain determined by the color signal level of the each pixel for correcting the each pixel to white and a unit gain.

The first color signal gain may be calculated as expressed in Equation 1 below, and the second color signal gain may be calculated as expressed in Equation 2 below.

$$R_{gain\_AWB}=G_{avg}/R_{avg}$$

$$B_{gain\_AWB}=G_{avg}/B_{avg} \quad (1)$$

where $R_{gain\_AWB}$ represents an R signal gain of the first color signal gain, $B_{gain\_AWB}$ represents a B signal gain of the first color signal gain, $G_{avg}$ represents an average of the G signal levels of pixels in the white estimation region, $R_{avg}$ represents an average of the R signal levels of the pixels in the white estimation region, and $B_{avg}$ represents an average of the B signal levels of the pixels in the white estimation region.

$$R_{gain\_in}=G_{in}/R_{in}$$

$$B_{gain\_in}=G_{in}/B_{in} \quad (2)$$

where $R_{gain\_in}$ represents an R signal gain of the second color signal gain, $B_{gain\_in}$ represents a B signal gain of the second color signal gain, $G_{in}$ represents a G signal level of each pixel, $R_{in}$ represents an R signal level of each pixel, and $B_{in}$ represents a B signal level of each pixel.

The auto white balance algorithm applying unit 12 is a block for performing a common auto white balance algorithm. The auto white balance algorithm applying unit 12 sets the white estimation region and calculates the first color signal gain for correcting the average color signal level of the pixels of the white estimation region to white.

Figure 2:
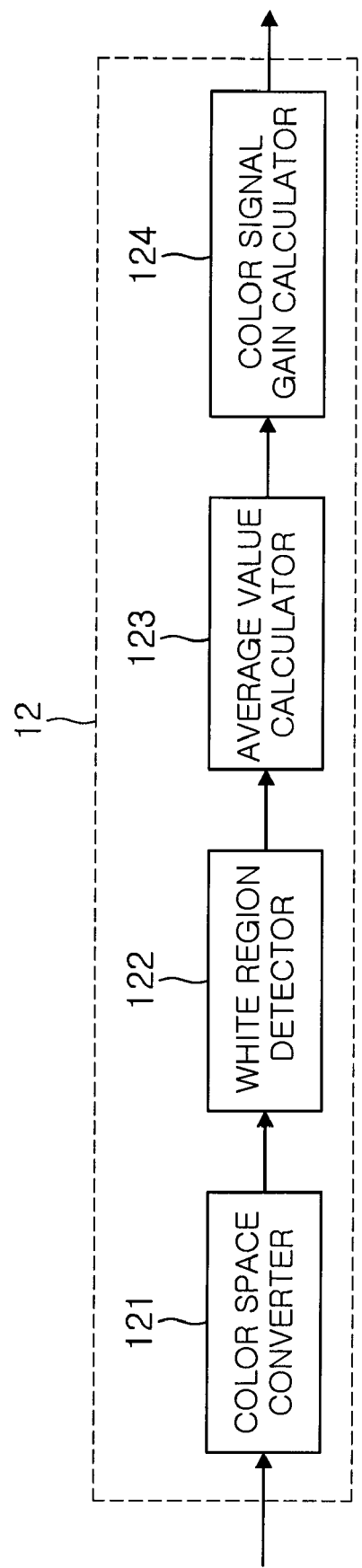
FIG. 2 is a block diagram of an auto white balance algorithm applying unit of the apparatus for controlling the gain of the color signal according to an exemplary embodiment of the present invention.

FIG. 2 is a block diagram of the auto white balance algorithm applying unit 12 of the apparatus for controlling the gain of the color signal according to an exemplary embodiment of the present invention.

Referring to FIG. 2, the auto white balance algorithm applying unit 12 may include a color space converter 121 converting a color space of the input image from an RGB color space to a YCbCr color space, a white region detector 122 detecting a region capable of estimating the existence of a distorted white pixel on the Cb-Cr coordinates of the converted color space, an average value calculator 123 integrating the Y, Cb and Cr values of the pixels of the region detected by the white region detector 122 to calculate the average values of the Y, Cb and Cr values, and an auto white balance gain calculator 124 calculating the first color signal gain for moving the Y, Cb and Cr average values calculated by the average value calculator 123 to the origin of the Cb-Cr coordinates.

Figure 3:
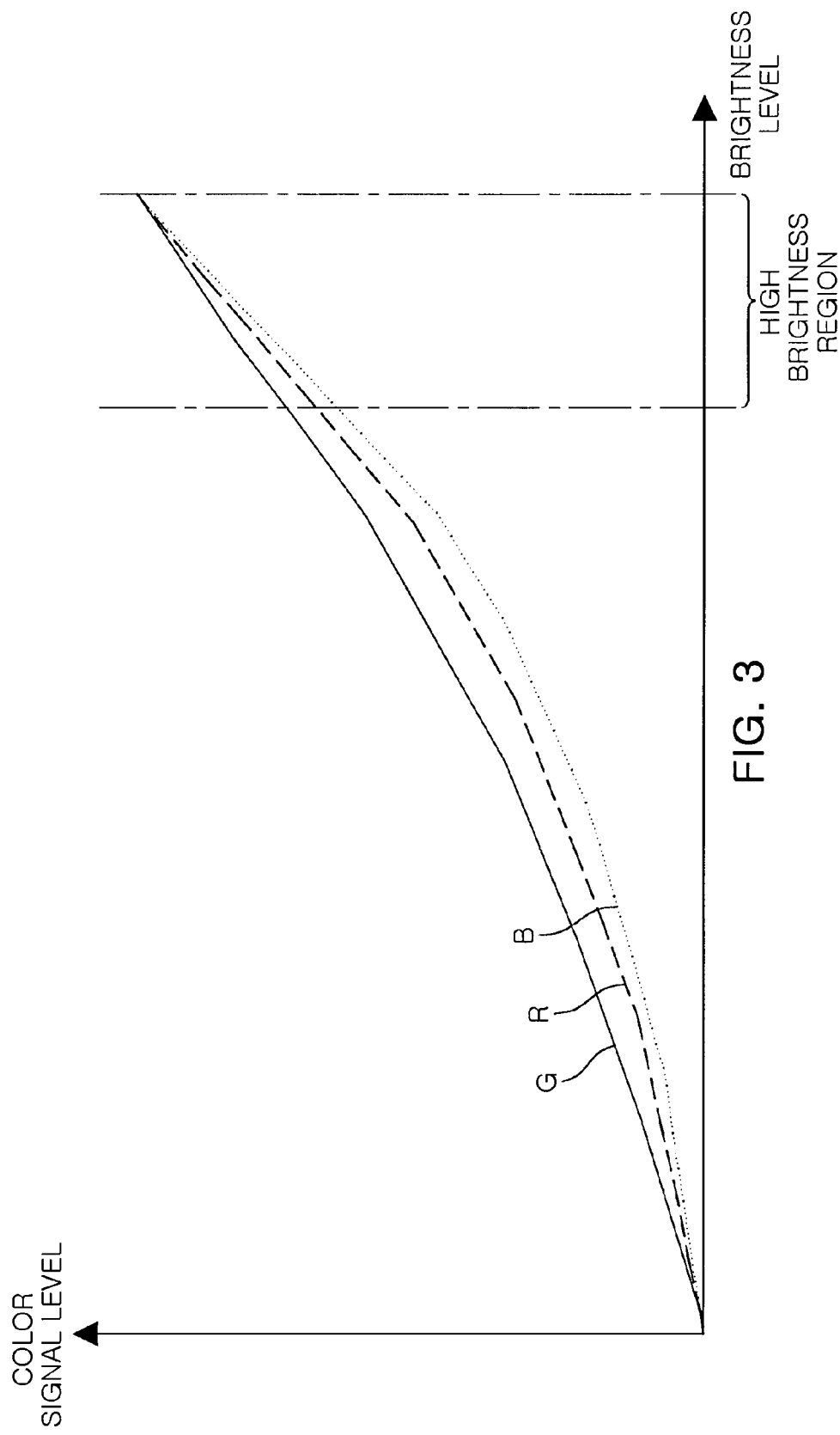
FIG. 3 is a graph illustrating R, G and B signal levels output from an image sensor according to the Grey level.

FIG. 3 is a graph illustrating R, G and B signal levels output from an image sensor according to the Grey level.

Generally, the G signal level is higher than the R signal level or the B signal level, and the respective signal levels nonlinearly increase according to brightness. Moreover, it can be seen that the respective R, G and B signal levels converge toward almost the same signal level because the light transmittance rate of the image sensor reaches saturation as the brightness of an image approximates to the maximum value. The change rate of the signal levels can be changed according to the feature of a fabricated sensor. Upon auto exposure control, the change rate of the signal levels may gradually be represented as a different result according to the change of a gain that is applied to the sensor, but the characteristics of the change rate are almost accorded. As illustrated in FIG. 3, when the R and B color signals are corrected with the same gain for the auto white balance adjustment because of the nonlinear characteristics of a color signal output form the sensor, the deflection of the color signal occurs according to a level of the color signal. Particularly, in a region having high brightness, since the R, G and B color signal have almost the same color level, white goes wrong. To prevent this phenomenon, an exemplary embodiment of the present invention selectively applies any one of the first color signal gain calculated by the auto white balance algorithm applying unit 12, the second color signal gain for converting each pixel into white using the color level of the input image and the unit gain to each pixel in view of the brightness of each pixel of the digital image.

Figure 4:
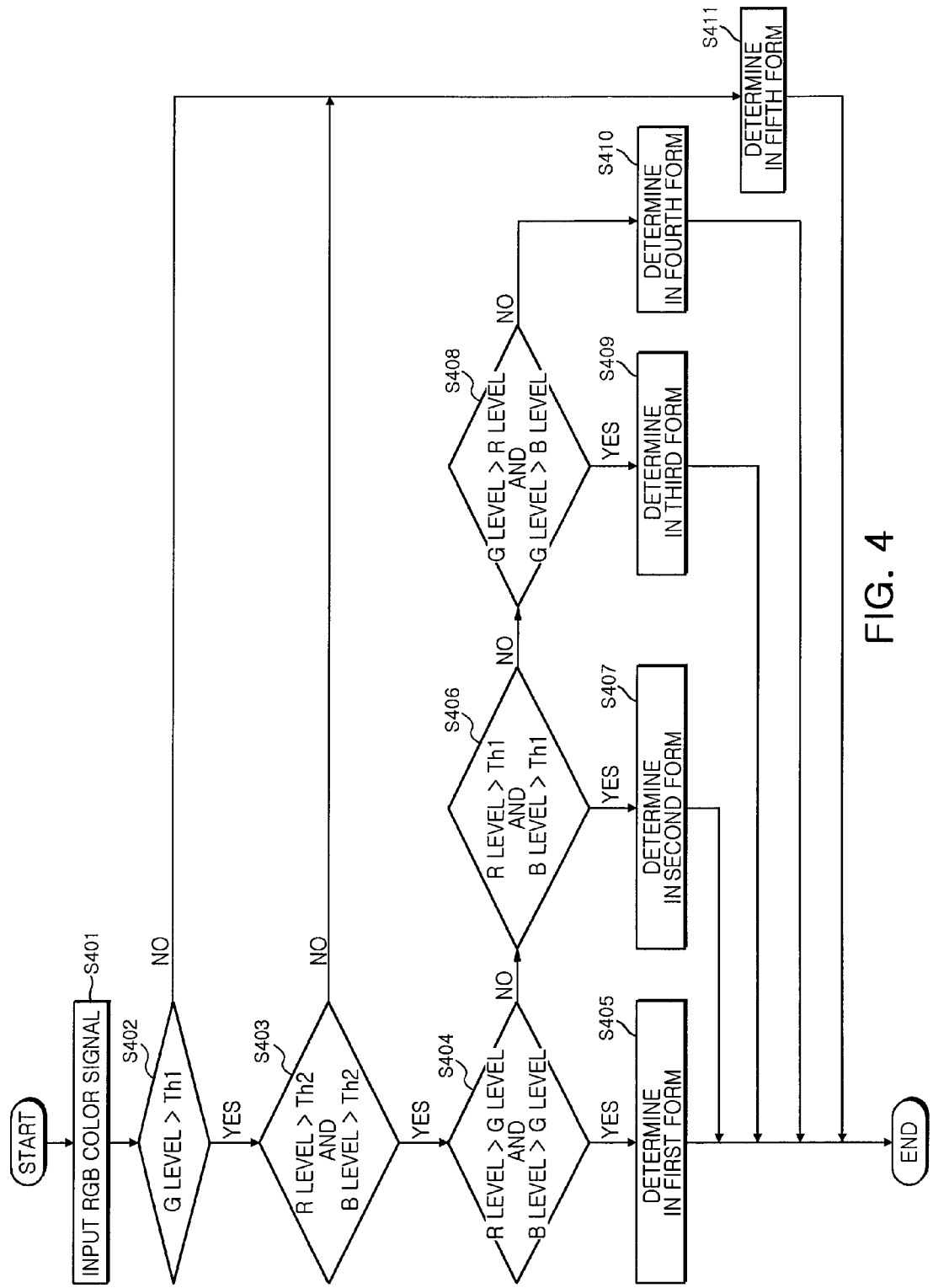
FIG. 4 is a flowchart illustrating a process of determining a form of pixels, which is performed in a pixel determining unit according to an exemplary embodiment of the present invention.
Figure 5:
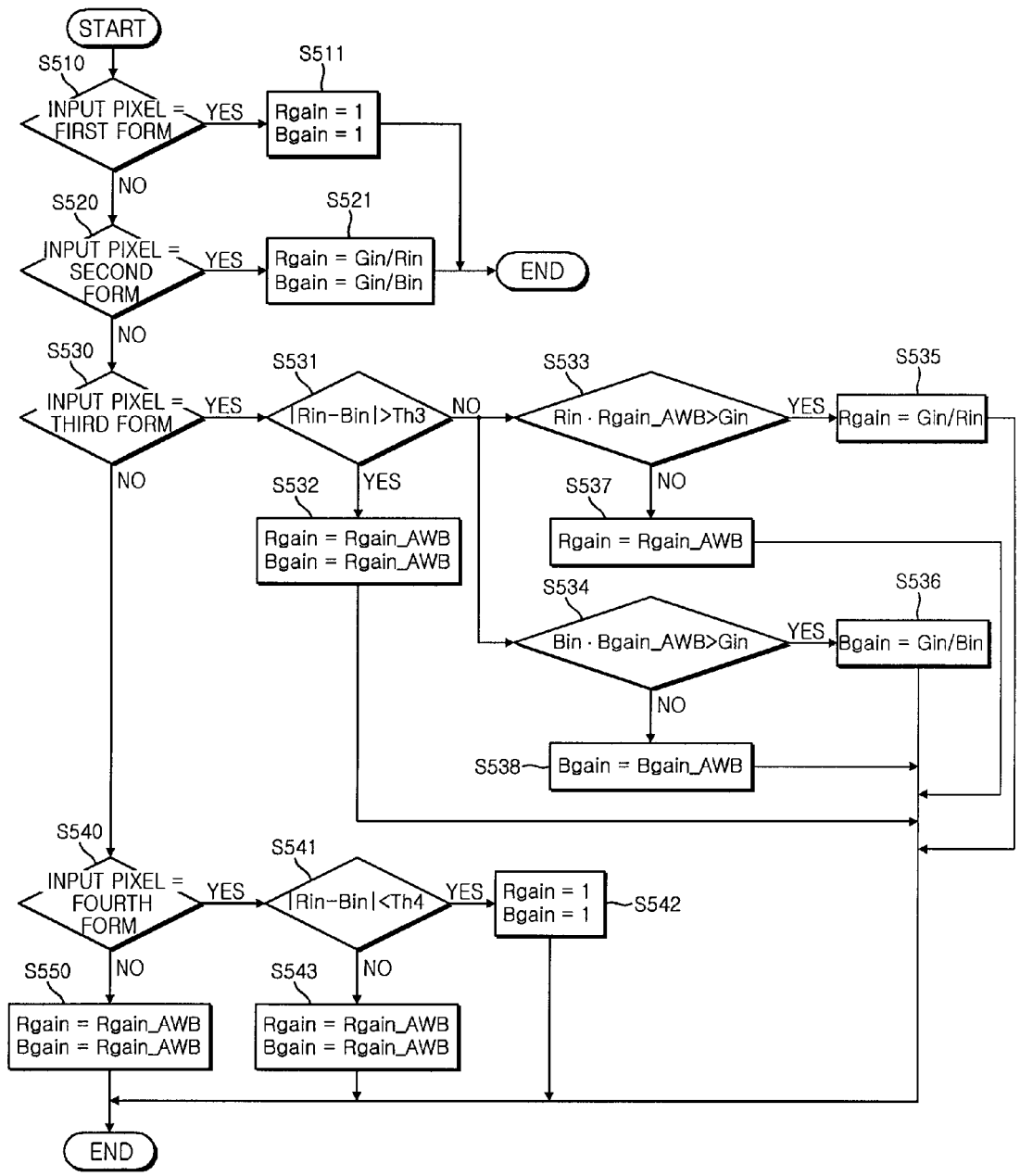
FIG. 5 is a flowchart illustrating a process of determining a color signal gain by pixel form, which is performed in a color signal gain determining unit according to an exemplary embodiment of the present invention.

FIG. 4 is a flowchart illustrating a process of determining a form of the pixels, which is performed in the pixel determining unit 11 according to an exemplary embodiment of the present invention. FIG. 5 is a flowchart illustrating a process of determining the color signal gain by pixel form, which is performed in the color signal gain determining unit 13 according to an exemplary embodiment of the present invention.

Hereinafter, the operations and effects of an exemplary embodiment of the present invention will be described in detail with reference to the accompanying drawings.

In the image apparatus of FIG. 1, an image signal detected and output by the image sensor 14 is the Beyer pattern image that commonly represents one pixel in only any one of the R, G and B colors. In a case of the image signal of the Beyer pattern output from the image sensor 14, an RGB color value of each pixel is determined and output by the RGB color signal generating unit 15. The apparatus 10 of an exemplary embodiment of the present invention receives the image signal having the determined RGB color value of each pixel, and determines a color signal gain capable of suitably correcting a color signal in order suitably to adjust the white balance of the input image.

First, the auto white balance algorithm applying unit 12 calculates the first color signal gain with a common auto white balance algorithm. The first color signal gain is a gain for determining the white estimation region from the input image without considering the brightness of the input image, and correcting the average color signal level of the pixels of the white estimation region to white.

As illustrated in FIG. 2, the auto white balance algorithm applying unit 12 may include the color space converter 121 converting the color space of the input image from the RGB color space to the YCbCr color space, the white region detector 122 detecting the region capable of estimating the existence of the distorted white pixel on the Cb-Cr coordinates of the converted color space, the average value calculator 123 integrating the Y, Cb and Cr values of the pixels of the region detected by the white region detector 122 to calculate the average value of the Y, Cb and Cr values, and the auto white balance gain calculator 124 calculating the first color signal gain for moving the Y, Cb and Cr average values calculated by the average value calculator 123 to the origin of the Cb-Cr coordinates.

The pixel determining unit 11 of an exemplary embodiment of the present invention determines a form of a pixel according to brightness. More specifically, as illustrated in FIG. 4, the pixel determining unit 11 receives an image represented in the RGB color signal in operation S401, and compares the G signal level of a pixel of the input image with a preset first threshold Th1 for determining a high brightness pixel in operation S402. When the G signal level is not greater than the first threshold Th1 as a result of the comparison of the operation S402, a pixel having the G signal level that is not greater than the first threshold Th1 is determined as a pixel that is not the high brightness pixel, and is determined in a fifth form in operation S411.

Subsequently, when the determination result shows that the G signal level is greater than the first threshold Th1, the pixel determining unit 11 compares the R and B signal levels of a corresponding pixel with a second threshold Th2 that is preset for determining the high brightness pixel and is less than the first threshold Th1 in operation S403. Similarly to the operation S402, when at least one of the R and B signal levels is not greater than the second threshold Th2 as a result of the comparison of the operation S403, a corresponding pixel is determined as a pixel which is not the high brightness pixel so that it is determined in the fifth form in operation S411.

When the R and B signal levels are greater than the second threshold Th2 as a result of the comparison of the operation S403, the pixel determining unit 11 compares the R and B signal levels of a corresponding pixel with the G signal level in operation S404. When both the R signal level and the B signal level are not greater than the G signal level as a result of the comparison of the operation S404, the pixel determining unit 11 compares the R and B signal levels with the first threshold Th1 in operation S406. When the R and B signal levels are greater than the first threshold Th1 as a result of the comparison of the operation S406, the pixel determining unit 11 determines a corresponding pixel in a second form in operation S407.

When the R and B signal levels are greater than the second threshold Th2 as a result of the comparison of the operation S403, the pixel determining unit 11 compares the R and B signal levels of a corresponding pixel with the G signal level in operation S404. When the R and B signal levels are not greater than the G signal level as a result of the comparison of the operation S404, the pixel determining unit 11 compares the R and B signal levels with the first threshold Th1 in operation S406. When the R and B signal levels are not greater than the first threshold Th1 as a result of the comparison of the operation S406, the pixel determining unit 11 compares the G signal level with the R and B signal levels in operation S408. When the G signal level is greater than or equal to the R and B signal levels as a result of the comparison of the operation S408, the pixel determining unit 11 determines a corresponding pixel in a third form in operation S409.

When the R and B signal levels are greater than the second threshold Th2 as a result of the comparison of the operation S403, the pixel determining unit 11 compares the R and B signal levels of a corresponding pixel with the G signal level in operation S404. When all the R and B signal levels are not greater than the G signal level as a result of the comparison of the operation S404, the pixel determining unit 11 compares the R and B signal levels with the first threshold Th1 in operation S406. When the R and B signal levels are not greater than the first threshold Th1 as a result of the comparison of the operation S406, the pixel determining unit 11 compares the G signal level with the R and B signal levels in operation S408. When the G signal level is less than the R and B signal levels as a result of the comparison of the operation S408, the pixel determining unit 11 determines a corresponding pixel in a fourth form in operation S410.

In this way, the pixel determining unit 11 compares the R, G and B signal levels of each pixel of the input image with one another, and determines a form of a corresponding pixel in any one of the first to fifth forms according to a result of the comparison. The color signal gain determining unit 13 determines a color signal gain suitable for each pixel form according to the determined pixel form.

Referring to FIG. 5, when an input pixel is determined in the first form in operation S510, the color signal gain determining unit 13 determines the color signal gain as the unit gain in operation S511. The R and B signal levels of the pixel of the first form are greater than an input G signal level exerting the most influence on the brightness of an image, and the G signal level is a high brightness pixel having a value greater than the first threshold Th1. In view of that there is almost no the deflection of the color signal levels as brightness increases and a probability that the R and B signal levels are less than the G signal level is high, a probability that the pixel of the first form is a pixel for representing a color having high brightness characteristics instead of white is high. Accordingly, the color signal gain determining unit 13 maintains the color signal level of the pixel by adjusting the gains of the R and B signals to the unit gain, i.e., 1.

When the input pixel is determined in the second form in operation S520, the color signal gain determining unit 13 determines the color signal gain as a gain for correcting the second color signal gain, i.e., an input color signal to white in operation S521. Although the pixel of the second form is a high brightness pixel, all the R, G and B signal levels of which are greater than the first threshold Th1 of the G signal level, since the R and B signal levels are not greater than the G signal level, a probability that the pixel of the second form has white is high. That is, since a probability that the pixel of the second form has high brightness and white is high, the second color signal gain for converting a pixel into white with the color signal level of the pixel may be determined as the color signal gain of the pixel of the second form instead of the first color signal gain calculated through an average.

When the input pixel is determined in the third form in operation S530, the color signal gain determining unit 13 compares a level difference between the R and B signal levels with a preset third threshold Th3 in operation S531. When the level difference between the R and B signal levels is greater than the third threshold Th3 as a result of the comparison of the operation S531, the color signal gain determining unit 13 may determine the first signal gain as the color signal gain of a corresponding pixel because the input pixel is a pixel having a color, the level deflection of the RGB color signal of which is very great.

When the level difference between the R and B signal levels is less than the third threshold Th3 as a result of the comparison of the operation S531, a probability that a corresponding pixel is a high brightness pixel having white is high. In this case, the color signal gain determining unit 13 multiplies the respective R and B signal levels by the first color signal gains of corresponding colors, and compares the respective multiplied values with the G signal levels of the corresponding pixels in operations S533 and S534. When the respective G signal levels are less than the values of the respective R and B signal levels multiplied by the first color signal gains of the corresponding colors as the results of the comparison of the operations S533 and S534, the color signal gain determining unit 13 determines the R signal gain of the corresponding pixel as the R signal gain of the second color signal gain in operation S535, and determines the B signal gain of the corresponding pixel as the B signal gain of the second color signal gain in operation S536. When the respective G signal levels are greater than the values of the respective R and B signal levels multiplied by the first color signal gains of the corresponding colors as the results of the comparison of the operations S533 and S534, the color signal gain determining unit 13 determines the R signal gain of the corresponding pixel as the R signal gain of the first color signal gain in operation S537, and determines the B signal gain of the corresponding pixel as the B signal gain of the first color signal gain in operation S538. In the above-described process for determining the color signal gain of the pixel of the third form, the values of the respective R and B signal levels multiplied by the first color signal gains of the corresponding colors correspond to color levels which are corrected through the application of the common auto white balance gain. A color signal gain (the first color signal gain) applied to the common auto white balance is a great gain which has difficulty in being applied to high brightness. That is, if the first color signal gain is applied to the R and B color signal having high brightness, it becomes greater than the G signal level. Accordingly, the R and B signal levels corrected by the first color signal gain being greater than the input G signal level denotes that a probability that the corresponding pixels are a white pixel having high brightness is high. In the above-described process for determining the color signal gain of the pixel of the third form, the color signal gain determining unit 13 multiplies the respective R and B signal levels by the first color signal gains of the corresponding colors, and compares the respective multiplied values with the G signal levels of the corresponding pixels in operations S533 and S534, thereby determining color signal gains.

When the input pixel is determined in the fourth form in operation S540, the color signal gain determining unit 13 compares a level difference between the R and B signal levels with a preset fifth threshold Th4 in operation S541. When the level difference between the R and B signal levels is greater than the fifth threshold Th4 as a result of the comparison of the operation S541, the color signal gain determining unit 13 determines the color signal gain of a corresponding pixel as the first signal gain in operation S543. On the other hand, when the level difference between the R and B signal levels is less than the fifth threshold Th4 as a result of the comparison of the operation S541, the color signal gain determining unit 13 determines the color signal gain of the corresponding pixel as the unit gain in operation S542. As a case of that the pixel of the fourth form is a high brightness pixel having an input G signal level greater than the first threshold Th1 and input R and B signal levels greater than the second threshold Th2 whereas any one of the R and B signal levels is greater than the G signal level, a probability that the pixels do not have white is high.

Finally, the color signal gain determining unit 13 determines the color signal gain determined in the fifth form as the first color signal gain. A probability that the pixels of the fifth form are not a high brightness pixel is high.

In the digital image apparatus of FIG. 1, the apparatus 10 outputs the color signal gain determined according to the forms which are determined by each pixel from the color to the color signal correcting unit 16, and the color signal correcting unit 16 performs a color correction by controlling the color signal gain determined through the above-described processes in the input image. Subsequently, the image signal processing unit 17 outputs the input image as a completed image by performing successive various digital image processing processes.

As described above, exemplary embodiments of the present invention analyze the color signal levels of the uncorrected input image and determine the kinds of the color signal gains to be applied to respective corresponding pixels before applying the color signal gains calculated for the auto white balance adjustment to the color signals of the input image, and thus can prevent a color distortion caused by the deflection of the color signals according to brightness. Particularly, exemplary embodiments of the present invention prevent a phenomenon where a color goes wrong in the white region representing high brightness, thereby adjusting the white balance more accurately.

Exemplary embodiments of the present invention suitably determine the gains of the color signals for the adjustment of the white balance by analyzing the levels of the R, G and B signals of the input image, thereby preventing a color distortion caused by the deflection of the color signals according to brightness. Accordingly, exemplary embodiments of the present invention prevent a phenomenon where a color goes wrong in the white region of high brightness, thereby adjusting the white balance more accurately.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for controlling gain of color signal, comprising:
    an auto white balance algorithm applying unit determining a white estimation region from an input image, and calculating a first color signal gain for correcting an average color signal level of pixels of the white estimation region to white;
    a pixel determining unit determining a form of each pixel according to brightness and color using the color signal level of the each pixel of the input image; and
    a color signal gain determining unit determining a color signal gain to be applied to the each pixel according to the form of the each pixel of the input image as any one of the first color signal gain, a second color signal gain determined by the color signal level of the each pixel for correcting the each pixel to white and a unit gain.

2. The apparatus of claim 1, wherein the auto white balance algorithm applying unit comprises:
    a color space converter converting a color space of the input image from an RGB color space to a YCbCr color space;
    a white region detector detecting a region capable of estimating an existence of a distorted white pixel on Cb-Cr coordinates of the converted color space;
    an average value calculator integrating Y, Cb and Cr values of pixels of the region detected by the white region detector to calculate an average value of the Y, Cb and Cr values; and
    an auto white balance gain calculator calculating the first color signal gain for moving the Y, Cb and Cr average values calculated by the average value calculator to the origin of the Cb-Cr coordinates.

3. The apparatus of claim 1, wherein the pixel determining unit determines a corresponding pixel as a first form when a G signal level of a pixel of the input image is greater than a preset first threshold for determining a high brightness pixel, R and B signal levels are greater than a second threshold that is preset for determining a high brightness pixel and is less than the first threshold, and the R and B signal levels are greater than the G signal level;
    the pixel determining unit determines a corresponding pixel as a second form when the G signal level of the pixel of the input image is greater than the first threshold, the R and B signal levels are greater than the second threshold, the R and B signal levels are less than the G signal level, and the R and B signal levels are greater than the first threshold;
    the pixel determining unit determines a corresponding pixel as a third form when the G signal level of the pixel of the input image is greater than the first threshold, the R and B signal levels are greater than the second threshold, the G signal level is greater than or equal to the R and B signal levels, and the R and B signal levels are less than the first threshold;

the pixel determining unit determines a corresponding pixel as a fourth form when the G signal level of the pixel of the input image is greater than the first threshold, the R and B signal levels are greater than the second threshold, and any one of the R and B signal levels is greater than the G signal level; and the pixel determining unit determines a corresponding pixel as a fifth form when the G signal level of the pixel of the input image is less than the first threshold, or the R and B signal levels are less than the second threshold.

4. The apparatus of claim 3, wherein the color signal gain determining unit determines a color signal gain of the pixel determined in the first form as the unit gain.

5. The apparatus of claim 3, wherein the color signal gain determining unit determines a color signal gain of the pixel determined in the second form as the second color signal gain.

6. The apparatus of claim 3, wherein when a pixel is determined in the third form;

the color signal gain determining unit determines a color signal gain of a corresponding pixel as the first color signal gain, when a level difference between the R and B signal levels is greater than a preset third threshold;

the color signal gain determining unit compares a multiplication result of an R signal level of a corresponding pixel and an R signal gain of the first color signal gain with a G signal level of a corresponding pixel, when the level difference between the R and B signal levels is less than the third threshold;

the color signal gain determining unit determines an R signal gain of a corresponding pixel as an R signal gain of the second color signal gain, when the G signal level is less than the multiplication result of the R signal level of the corresponding pixel and the R signal gain of the first color signal gain;

the color signal gain determining unit determines an R signal gain of a corresponding pixel as the R signal gain of the first color signal gain and compares a multiplication result of a B signal level of a corresponding pixel and a B signal gain of the first color signal gain with a G signal level of a corresponding pixel, when the G signal level is greater than the multiplication result of the R signal level of the corresponding pixel and the R signal gain of the first color signal gain;

the color signal gain determining unit determines a B signal gain of a corresponding pixel as the B signal gain of the second color signal gain when the G signal level is less than the multiplication result of the B signal level of the corresponding pixel and the B signal gain of the first color signal gain; and the color signal gain determining unit determines a B signal gain of a corresponding pixel as the B signal gain of the first color signal gain when the G signal level is greater than the multiplication result of the B signal level of the corresponding pixel and the B signal gain of the first color signal gain.

7. The apparatus of claim 3, wherein when a pixel is determined in the fourth form;

the color signal gain determining unit determines a color signal gain of a corresponding pixel as the first color signal gain, when a level difference between the R and B signal levels is greater than a preset fourth threshold; and the color signal gain determining unit determines a color signal gain of a corresponding pixel as the unit gain, when the level difference between the R and B signal levels is less than the preset fourth threshold.

8. The apparatus of claim 3, wherein the color signal gain determining unit determines a color signal gain of the pixel determined in the fifth form as the first color signal gain.

9. The apparatus of claim 1, wherein the first color signal gain is determined by the following equation (1), $$R_{gain\_AWB} = G_{avg}/R_{avg}$$

$$B_{gain\_AWB} = G_{avg}/B_{avg} \qquad (1)$$

where $R_{gain\_AWB}$ represents an R signal gain of the first color signal gain, $B_{gain\_AWB}$ represents a B signal gain of the first color signal gain, $G_{avg}$ represents an average of the G signal levels of pixels in the white estimation region, $R_{avg}$ represents an average of the R signal levels of the pixels in the white estimation region, and $B_{avg}$ represents an average of the B signal levels of the pixels in the white estimation region.

10. The apparatus of claim 1, wherein the second color signal gain is determined by the following equation (2), $$R_{gain\_in} = G_{in}/R_{in}$$

$$B_{gain\_in} = G_{in}/B_{in} \qquad (2)$$

where $R_{gain\_in}$ represents an R signal gain of the second color signal gain, $B_{gain\_in}$ represents a B signal gain of the second color signal gain, $G_{in}$ represents a G signal level of each pixel, $R_{in}$ represents an R signal level of each pixel, and $B_{in}$ represents a B signal level of each pixel.

11. A method for controlling gain of color signal, the method comprising:

determining a white estimation region from an input image, and calculating a first color signal gain for correcting an average color signal level of pixels of the white estimation region to white;

determining a form of each pixel according to brightness and color using the color signal level of the each pixel of the input image; and determining a color signal gain to be applied to the each pixel according to the form of the each pixel of the input image as any one of the first color signal gain, a second color signal gain determined by the color signal level of the each pixel for correcting the each pixel to white and a unit gain.

12. The method of claim 11, wherein the determining of the white estimation region comprises:

converting a color space of the input image from an RGB color space to a YCbCr color space;

detecting a region capable of estimating an existence of a distorted white pixel on Cb-Cr coordinates of the converted color space;

integrating Y, Cb and Cr values of pixels of the region detected by the white region detector to calculate an average value of the Y, Cb and Cr values; and calculating the first color signal gain for moving the Y, Cb and Cr average values calculated by the average value calculator to the origin of the Cb-Cr coordinates.

13. The method of claim 11, wherein the determining of the form comprises:

comparing a G signal level of a pixel of the input image with a preset first threshold for determining a high brightness pixel;

comparing R and B signal levels of a corresponding pixel with a second threshold that is preset for determining a high brightness pixel with is less than the first threshold, when the G signal level is greater than the first threshold as a result of the comparison;

determining a corresponding pixel as a first form, when the R and B signal levels are greater than the second threshold and the G signal level of the corresponding pixel is greater than the G signal level as a result of the comparison;

determining a corresponding pixel as a second form, when the R and B signal levels are greater than the second threshold, the G signal level of the corresponding pixel is less than the G signal level, and the R and B signal levels are greater than the first threshold as a result of the comparison;

determining a corresponding pixel as a third form, when the R and B signal levels are greater than the second threshold, the G signal level of the corresponding pixel is greater than or equal to the R and B signal levels, and the R and B signal levels are less than the first threshold as a result of the comparison;

determining a corresponding pixel as a fourth form, when the R and B signal levels are greater than the second threshold, and any one of the R and B signal levels is greater than the G signal level; and determining a corresponding pixel as a fifth form, when the G signal level is less than the first threshold, and the R and B signal levels are less than the second threshold as a result of the comparison.

14. The method of claim 13, wherein the color signal gain of the pixel determined in the first form is determined as the unit gain.

15. The method of claim 13, wherein the color signal gain of the pixel determined in the second form is determined as the second color signal gain.

16. The method of claim 13, wherein when a pixel is determined in the third form, the determining of the color signal gain comprises:

comparing a level difference between the R and B signal levels with a preset third threshold;

determining a color signal gain of a corresponding pixel as the first color signal gain, when the level difference between the R and B signal levels is greater than the third threshold as a result of the comparison;

comparing a multiplication result of an R signal level of a corresponding pixel and an R signal gain of the first color signal gain with a G signal level of a corresponding pixel, when the level difference between the R and B signal levels is less than the third threshold as a result of the comparison;

determining an R signal gain of a corresponding pixel as an R signal gain of the second color signal gain, when the G signal level is less than the multiplication result of the R signal level of the corresponding pixel and the R signal gain of the first color signal gain as a result of the comparison;

determining an R signal gain of a corresponding pixel as an R signal gain of the first color signal gain, when the G signal level is greater than the multiplication result of the R signal level of the corresponding pixel and the R signal gain of the first color signal gain as a result of the comparison;

comparing the multiplication result of the B signal level of the corresponding pixel and the B signal gain of the first color signal gain with the G signal level of the corresponding pixel, when the level difference between the R and B signal levels is less than the third threshold as a result of the comparison;

determining a B signal gain of a corresponding pixel as a B signal gain of the second color signal gain when the G signal level is less than the multiplication result of the B signal level of the corresponding pixel and the B signal gain of the first color signal gain as a result of the comparison; and determining a B signal gain of a corresponding pixel as a B signal gain of the first color signal gain when the G signal level is greater than the multiplication result of the B signal level of the corresponding pixel and the B signal gain of the first color signal gain as a result of the comparison.

17. The method of claim 13, wherein when a pixel is determined in the fourth form, the determining of the color signal gain comprises:

comparing a level difference between the R and B signal levels is greater than a preset fourth threshold;

determining a color signal gain of a corresponding pixel as the first color signal gain, when the level difference between the R and B signal levels is greater than a preset fourth threshold as a result of the comparison; and determining the color signal gain of the corresponding pixel as the unit gain, when the level difference between the R and B signal levels is less than the preset fourth threshold as a result of the comparison.

18. The method of claim 13, wherein the color signal gain of the pixel determined in the fifth form is determined as the first color signal gain.

19. The method of claim 11, wherein the first color signal gain is determined by the following equation (1), $$R_{gain\_AWB} = G_{avg}/R_{avg}$$

$$B_{gain\_AWB} = G_{avg}/B_{avg} \qquad (2)$$

where $R_{gain\_AWB}$ represents an R signal gain of the first color signal gain, $B_{gain\_AWB}$ represents a B signal gain of the first color signal gain, $G_{avg}$ represents an average of the G signal levels of pixels in the white estimation region, $R_{avg}$ represents an average of the R signal levels of the pixels in the white estimation region, and $B_{avg}$ represents an average of the B signal levels of the pixels in the white estimation region.

20. The method of claim 11, wherein the second color signal gain is determined by the following equation (2), $$R_{gain\_in} = G_{in}/R_{in}$$

$$B_{gain\_in} = G_{in}/B_{in} \qquad (2)$$

where $R_{gain\_in}$ represents an R signal gain of the second color signal gain, $B_{gain\_in}$ represents a B signal gain of the second color signal gain, $G_{in}$ represents a G signal level of each pixel, $R_{in}$ represents an R signal level of each pixel, and $B_{in}$ represents a B signal level of each pixel.

* * * * *